United States Patent
Liu et al.

(10) Patent No.: US 10,953,868 B2
(45) Date of Patent: Mar. 23, 2021

(54) CONTROL METHOD WHEN VEHICLE TIRE BURSTS, VEHICLE CONTROL SYSTEM AND VEHICLE

(71) Applicant: BYD COMPANY LIMITED, Guangdong (CN)

(72) Inventors: Liang Liu, Shenzhen (CN); Xiaoliang Shang, Shenzhen (CN); Fang Liu, Shenzhen (CN); Enfu Liu, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 233 days.

(21) Appl. No.: 16/304,302

(22) PCT Filed: Mar. 28, 2017

(86) PCT No.: PCT/CN2017/078465
§ 371 (c)(1),
(2) Date: Nov. 26, 2018

(87) PCT Pub. No.: WO2017/202135
PCT Pub. Date: Nov. 30, 2017

(65) Prior Publication Data
US 2019/0084556 A1    Mar. 21, 2019

(30) Foreign Application Priority Data
May 25, 2016    (CN) .......................... 201610355679.5

(51) Int. Cl.
*B60W 30/02*    (2012.01)
*B60W 10/04*    (2006.01)
(Continued)

(52) U.S. Cl.
CPC ............ *B60W 30/02* (2013.01); *B60W 10/04* (2013.01); *B60W 10/08* (2013.01); *B60W 10/18* (2013.01);
(Continued)

(58) Field of Classification Search
CPC combination set(s) only.
See application file for complete search history.

(56) References Cited

U.S. PATENT DOCUMENTS 5,696,681 A * 12/1997 Hrovat .................. B60T 8/1755
                                                                    701/70
7,677,095 B1 *  3/2010 Bartol ..................... B60T 8/885
                                                                    73/146.2
(Continued)

FOREIGN PATENT DOCUMENTS

| CN | 101380876 A | 3/2009 |
|----|-------------|--------|
| CN | 103481876 A | 1/2014 |

(Continued)

OTHER PUBLICATIONS

English Translation of International Search Report from PCT/CN2017/078465 dated Jun. 21, 2017 (3 pages).

*Primary Examiner* — Thomas G Black
*Assistant Examiner* — Ana D Thomas
(74) *Attorney, Agent, or Firm* — Calfee Halter & Griswold LLP

(57) ABSTRACT

A control method when a vehicle tire bursts, a vehicle control system, and a vehicle, the method including: obtaining the wheel information of the burst tire when the vehicle tire bursts; judging the deviation condition of the vehicle after the tire burst, and obtaining a driving intention of a driver; and calculating the driving torque and the braking torque of the wheels without burst tire according to the deviation condition and the driving intention of the driver, and controlling the wheels without burst tire according to the (Continued)

driving torque and the braking torque to correct the deviation condition of the vehicle, so that the vehicle remains normal driving within a preset distance.

13 Claims, 7 Drawing Sheets

(51) Int. Cl.
　　*B60W 10/18*　　(2012.01)
　　*B60W 40/09*　　(2012.01)
　　*B60W 20/00*　　(2016.01)
　　*B60W 10/184*　　(2012.01)
　　*B60W 10/08*　　(2006.01)
　　*B60K 6/50*　　(2007.10)

(52) U.S. Cl.
　　CPC .......... *B60W 10/184* (2013.01); *B60W 40/09* (2013.01); *B60K 6/50* (2013.01); *B60W 20/00* (2013.01); *B60W 2520/16* (2013.01); *B60W 2540/106* (2013.01); *B60W 2540/12* (2013.01); *B60W 2540/14* (2013.01); *B60W 2540/18* (2013.01); *B60Y 2200/92* (2013.01)

(56) References Cited

U.S. PATENT DOCUMENTS

| 2005/0080546 | A1* | 4/2005 | Milot | B60W 30/02 |
| | | | | 701/70 |
| 2006/0111829 | A1* | 5/2006 | Williams | B60R 21/013 |
| | | | | 701/79 |
| 2017/0137023 | A1* | 5/2017 | Anderson | B60W 50/14 |
| 2017/0174193 | A1* | 6/2017 | Kirkpatrick | B60C 23/0488 |
| 2017/0182999 | A1* | 6/2017 | Lai | B60C 23/04 |

FOREIGN PATENT DOCUMENTS

| CN | 104773168 A | 7/2015 |
| CN | 204548096 U | 8/2015 |
| CN | 106364481 A | 2/2017 |
| CN | 106467111 A | 3/2017 |
| DE | 10357254 A1 | 6/2005 |
| EP | 1106460 A2 | 6/2001 |
| JP | 0466334 A | 3/1992 |

\* cited by examiner

CONTROL METHOD WHEN VEHICLE TIRE BURSTS, VEHICLE CONTROL SYSTEM AND VEHICLE

CROSS REFERENCE OF RELATED APPLICATIONS

This application is based on International Application No. PCT/CN2017/078465, filed on Mar. 28, 2017, which claims priority to China Patent Application No. 201610355679.5, filed on May 9, 2016, which are incorporated herein by reference in their entireties.

TECHNICAL FIELD

This application relates to the field of vehicle technology, and in particular, to a control method when a vehicle tire bursts, a vehicle control system, and a vehicle having the same.

BACKGROUND

High-speed driving tire burst is considered to be the first killer of high-speed driving safety. The data shows that the number of deaths caused by high-speed driving tire burst accounts for nearly half of the deaths from highway accidents. Therefore, solving the tire burst problem can significantly improve vehicle safety.

In order to solve the tire burst problem, the most widely used method is to use run-flat tires, which in terms of structure are non-pneumatic tires or tires that greatly enhance the sidewall stiffness. However, there are two problems with this:

(1) in case of existing run-flat tires, the hardness of the tire carcass becomes larger, and the tread buffer capacity becomes smaller. Therefore, the damping effect of the tire is weakened, and the vibration and impact transmitted by road surface to the vehicle body through the tire become larger, thereby increasing the noise and vibration of the vehicle;

(2) during the driving of the vehicle, the tire material hysteresis caused by the deformation of the carcass is the main cause of the rolling resistance of the vehicle. Since the volume and weight of the existing run-flat tire materials are significantly larger than that of the pneumatic radial tires used in the current vehicles, the rolling resistance is relatively large, which in turn reduces the fuel economy of the vehicle.

SUMMARY

According to a first aspect of the application, a control method is provided. The control method when a vehicle tire bursts includes: obtaining the wheel information of the burst tire when the vehicle tire bursts; judging a deviation condition of the vehicle after the tire burst, and obtaining a driving intention of a driver; and determining the driving torque and the braking torque of the wheels without burst tire according to the deviation condition and the driving intention of the driver, and controlling the wheels without burst tire according to the driving torque and the braking torque to correct the deviation condition of the vehicle, so that the vehicle remains normal driving within a preset distance.

According to the control method when a vehicle tire bursts, when the vehicle tire bursts, the wheel information of the burst tire is obtained, the deviation condition of the vehicle after the tire burst is judged, and the driving intention of the driver is obtained; and then the driving torque and the braking torque of the wheels without burst tire is calculated according to the deviation condition and the driving intention of the driver, and the wheels without burst tire are controlled according to the driving torque and the braking torque to correct the deviation condition of the vehicle, so that the vehicle remains normal driving within a preset distance. The method can control the wheels according to the deviation condition of the vehicle and the driving intention of the driver after the vehicle tire bursts, so that the vehicle can continue to drive according to the driving intention of the driver, thereby not only achieving the effect of using run-flat tires, but also avoiding the problems of noise, vibration and poor fuel economy of the vehicle when using the run-flat tires.

According to a second aspect of this application, a vehicle control system is provided. The vehicle control system includes: a tire detector detecting whether a vehicle has a burst tire, and obtaining wheel information of the burst tire when the vehicle has the burst tire; a first judging module configured to judge a deviation condition of the vehicle after the tire bursts; a controller which respectively communicates with the tire detector and the first judging module, wherein the controller is configured to obtain a driving intention of the driver, calculate a driving torque and a braking torque of wheels without burst tire according to the deviation condition and the driving intention of the driver, and to control the wheels without burst tire according to the driving torque and the braking torque to correct the deviation condition of the vehicle, so that the vehicle remains normal driving within a preset distance.

According to the vehicle control system of the embodiment of this application, when a vehicle tire bursts, the wheel information of the burst tire is obtained by the tire detecting module, the deviation condition of the vehicle after the tire bursts is judged by the first judging module, and the driving intention of the driver is obtained by the controller, then the controller calculates the driving torque and the braking torque of the wheels without burst tire according to the deviation condition and the driving intention of the driver, and to control the wheels without burst tire according to the driving torque and the braking torque to correct the deviation condition of the vehicle, so that the vehicle remains normal driving within a preset distance. The system can control the wheels according to the deviation condition of the vehicle and the driving intention of the driver after the vehicle tire bursts, so that the vehicle can continue to drive according to the driving intention of the driver, thereby not only achieving the effect of using run-flat tires, but also avoiding the problems of noise, vibration and poor fuel economy of the vehicle when using the run-flat tires.

According to a further aspect of this application, a vehicle is provide. The vehicle includes: the above-described vehicle control system.

With the vehicle control system, the vehicle according to the embodiment of this application can control the wheels according to the deviation condition of the vehicle and the driving intention of the driver after the vehicle tire bursts, so that the vehicle can continue to drive according to the driving intention of the driver, thereby not only achieving the effect of using run-flat tires, but also avoiding the problems of noise, vibration and poor fuel economy of the vehicle when using the run-flat tires.

Figure 1:
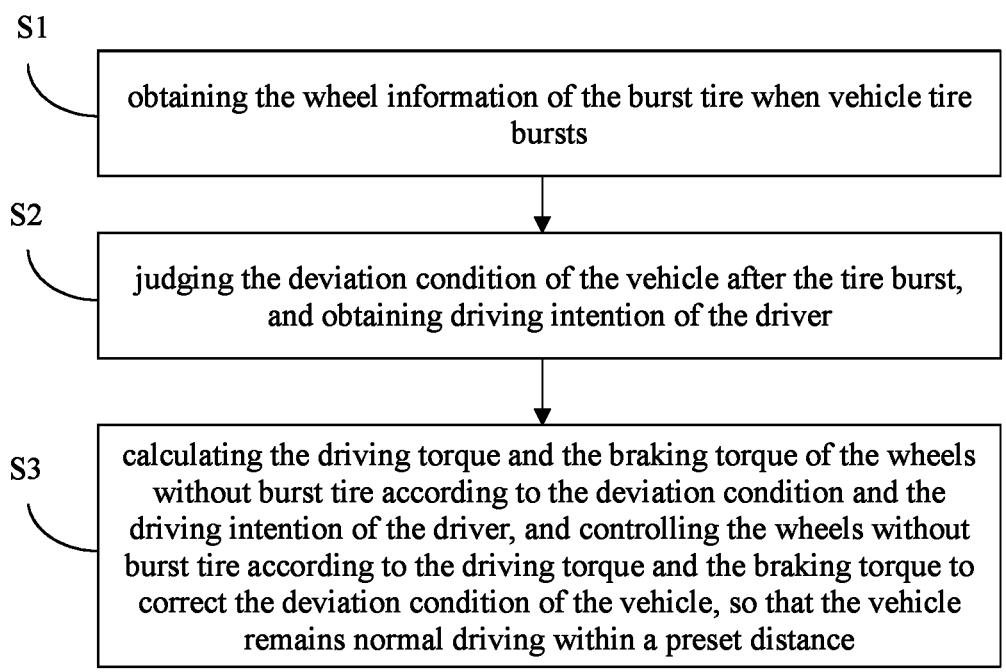
FIG. 1 is a flow chart of a control method when a vehicle tire bursts in accordance with an embodiment of this application.

Reference numbers: engine 101, transmission 102, motor 103, speed reducer 104, main reducer and differential 105, brake calipers and brake discs 106, 108, 134 and 135, right front wheel 107, left front wheel 109, right rear wheel 133, left rear wheel 136, inlet valves 110, 114, 124 and 128, outlet valves 111, 115, 125 and 129, oil pressure sensors 112, 113, 122, 123, 126 and 127, linear solenoid valves 120 and 121, switching solenoid valves 118 and 119, accumulator 116, hydraulic pump 117, oil reservoir 130, brake master cylinder and stroke simulator 131, brake pedal 132.

DETAILED DESCRIPTION

The embodiments of this application are described in detail below, and the examples of the embodiments are illustrated in the drawings, wherein the same or similar reference numbers are used to refer to the same or similar elements or elements having the same or similar functions. The embodiments described below with reference to the drawings are intended to be illustrative of the invention and are not to be construed as limiting.

A control method when a vehicle tire bursts, a vehicle control system, and a vehicle in accordance with an embodiment of this application will be described below with reference to the accompanying drawings.

FIG. 1 is a flow chart of a control method when a vehicle tire bursts in accordance with an embodiment of this application. As shown in FIG. 1, the control method when a vehicle tire bursts includes the following steps:

S1, when a vehicle tire bursts, the wheel information of the burst tire is obtained.

In an embodiment, a sensor can be used to determine whether the vehicle has a burst tire and which wheel has the burst tire.

S2, the deviation condition of the vehicle after the tire burst is judged, and a driving intention of a driver is obtained.

In the embodiment of this application, the vehicle body attitude sensor can be used to determine the deviation condition of the vehicle after the tire bursts.

According to an embodiment of this application, the step of obtaining the driving intention of the driver includes: obtaining a steering wheel angle signal, a brake pedal signal, an accelerator pedal signal, and a clutch pedal signal of the vehicle; calculating a steering wheel angular acceleration according to the steering wheel angle signal, calculating a brake pedal acceleration according to the brake pedal signal and calculating an accelerator pedal acceleration according to the accelerator pedal signal; and determining the driving intention of the driver according to the steering wheel angle signal, the brake pedal signal, the accelerator pedal signal, the clutch pedal signal, the steering wheel angular acceleration, the brake pedal acceleration, and the accelerator pedal acceleration.

That is to say, the driving intention of the driver and the urgency degree can be calculated and evaluated from the steering wheel angle signal, the depth signal of the brake pedal, the depth signal of the accelerator pedal, and the depth signal of the clutch pedal (no need to detect when the vehicle has no clutch pedal) detected by the sensor, and the steering wheel angular acceleration, the brake pedal acceleration and the accelerator pedal acceleration which are simultaneously calculated.

S3, the driving torque and the braking torque of the wheels without burst tire is calculated according to the deviation condition and the driving intention of the driver, and the wheels without burst tire are controlled according to the driving torque and the braking torque to correct the deviation condition of the vehicle, so that the vehicle remains normal driving within a preset distance.

That is to say, after the vehicle tire bursts, the driving torque and the braking torque of each wheel are obtained by calculating and analyzing the deviation condition of the vehicle and the driving intention of the driver, and then the vehicle is controlled according to the driving torque and the braking torque to prevent the undesired deviation condition of the vehicle, so that the vehicle can freely accelerate and decelerate within a certain range, and the driving direction of the vehicle is controllable. The driver makes the vehicle turn according to the intention of the driver by operating the steering wheel, thereby maintaining normal driving of the vehicle for a relatively long distance.

According to an embodiment of this application, the vehicle includes a left front wheel, a right front wheel, a left rear wheel, and a right rear wheel, wherein when the vehicle is driven by the left front wheel and the right front wheel, if the right rear wheel has a burst tire, in the case that the total driving torque of the vehicle is controlled to be constant, the deviation condition of the vehicle is corrected by increasing the driving torque of the left front wheel and the right front wheel and braking the left rear wheel, or the deviation condition of the vehicle is corrected by increasing the driving torque of the right front wheel and decreasing the driving torque of the left front wheel; when the vehicle is driven by the left front wheel and the right front wheel, if the right front wheel has a burst tire, in the case that the total driving torque is controlled to be constant, the deviation condition of the vehicle is corrected by increasing the driving torque of the right rear wheel and decreasing the driving torque of the left front wheel; and when the vehicle is driven by the left front wheel, the right front wheel, the left rear wheel, and the right rear wheel, if the right front wheel has a burst tire, in the case that the total driving torque is controlled to be constant, the deviation condition of the vehicle is corrected by increasing the driving torque of the right rear wheel and decreasing the driving torque of the left front wheel and the left rear wheel.

Figure 2:
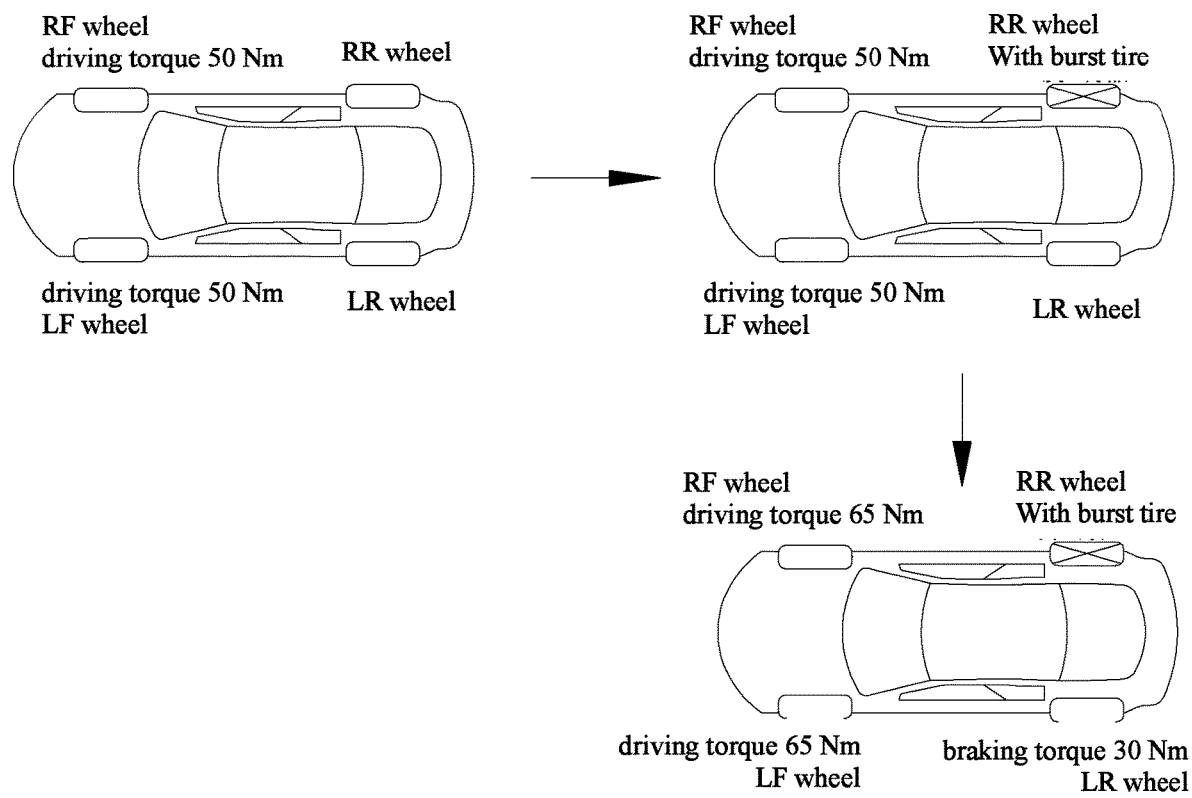
FIG. 2 is a schematic view showing the wheel control at the time of a vehicle tire bursts in accordance with the first embodiment of this application.
Figure 3:
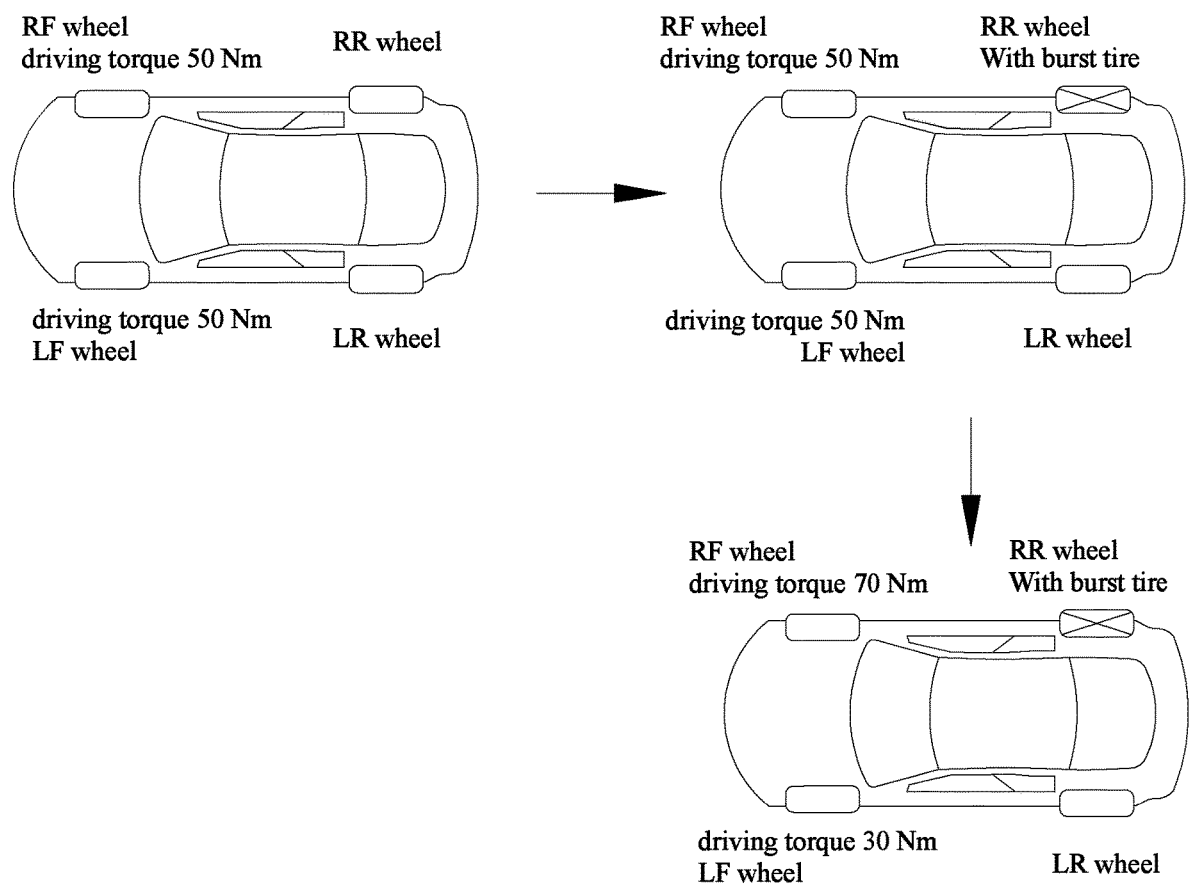
FIG. 3 is a schematic view showing the wheel control at the time of a vehicle tire bursts in accordance with the second embodiment of this application.

As shown in FIG. 2 and FIG. 3, when the vehicle is driven by the left front wheel and the right front wheel, it is assumed that the total driving torque is 100 Nm, the driving torque of the left front wheel is 50 Nm, and the driving torque of the right front wheel is 50 Nm. If the right rear wheel has a burst tire during driving, the wheels without burst tire will be controlled in a short period of time according to the deviation condition of the vehicle after tire bursts and the driving intention of the driver. As shown in FIG. 2, in the case of ensuring that the total driving torque of 100 Nm remains unchanged, the deviation condition of the vehicle can be corrected by increasing the driving torque of the left front wheel and the right front wheel and controlling the left rear wheel to participate in the braking. For example, the driving torque of the left front wheel can be increased to 65 Nm, the driving torque of the right front wheel can be increased to 65 Nm, and the braking torque of 30 Nm is applied to the left rear wheel to correct the deviation condition of the vehicle. Alternatively, as shown in FIG. 3, in the case of ensuring that the total driving torque of 100 Nm remains unchanged, the deviation condition of the vehicle can be corrected by increasing the driving torque of the right front wheel and decreasing the driving torque of the left front wheel. For example, the driving torque of the right front wheel can be increased to 70 Nm, and the driving torque of the left front wheel can be reduced to 30 Nm. In practice, any one of them can be chosen.

Figure 4:
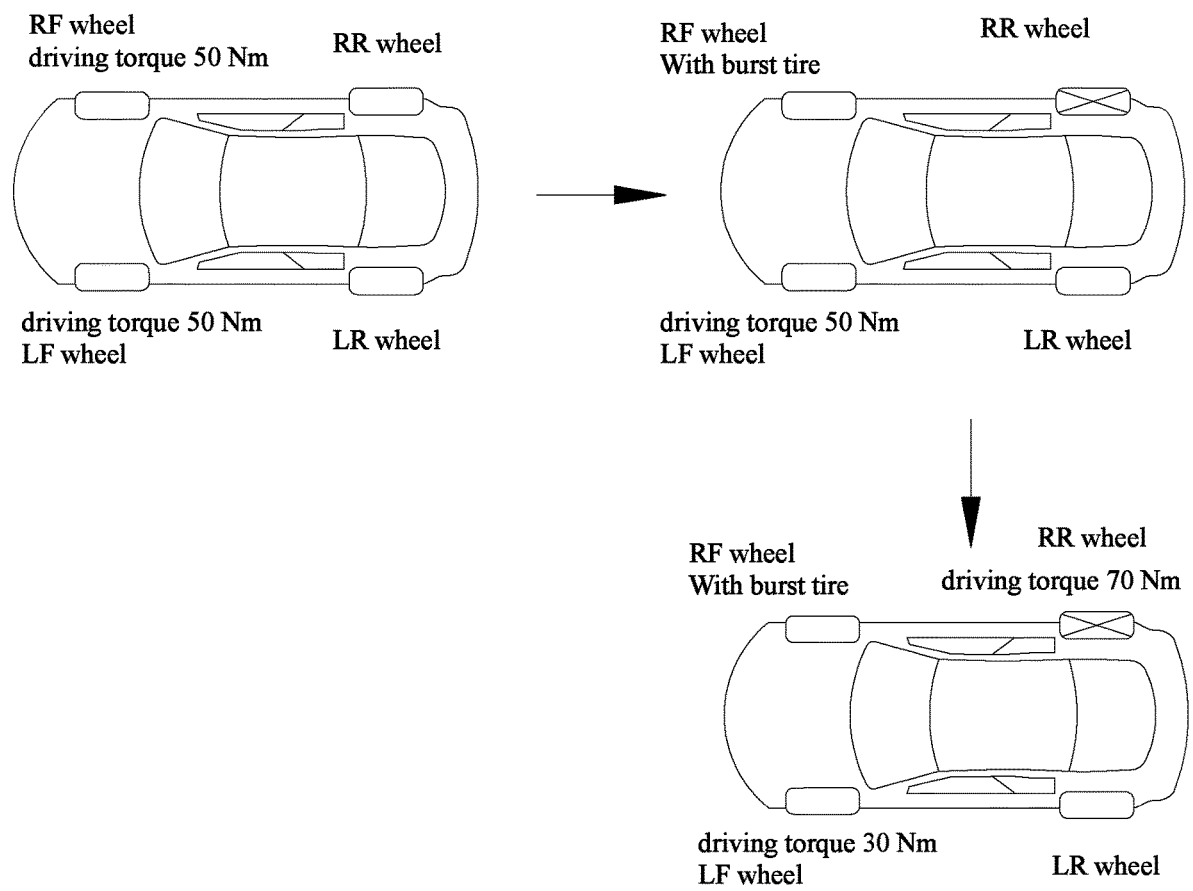
FIG. 4 is a schematic view showing the wheel control at the time of a vehicle tire bursts in accordance with the third embodiment of this application.

As shown in FIG. 4, when the vehicle is driven by the left front wheel and the right front wheel, it is assumed that the total driving torque is 100 Nm, the driving torque of the left front wheel is 50 Nm, and the driving torque of the right front wheel is 50 Nm. If the right front wheel has a burst tire during driving, in the case of ensuring that the total driving torque of 100 Nm remains unchanged, the deviation condition of the vehicle can be corrected by increasing the driving torque of the right rear wheel and decreasing the driving torque of the left front wheel. For example, the driving torque of the right rear wheel can be increased to 70 Nm, and the driving torque of the left front wheel can be decreased to 30 Nm.

Figure 5:
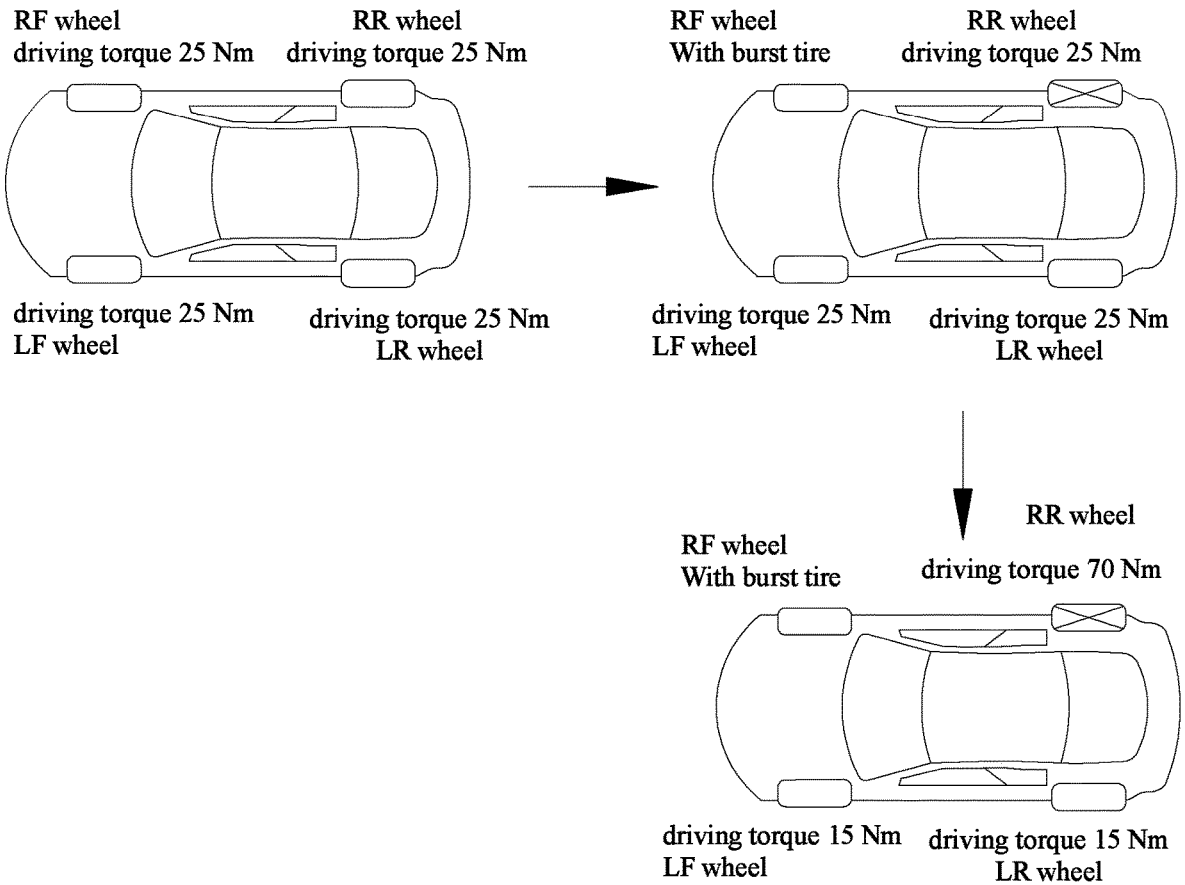
FIG. 5 is a schematic view showing the wheel control at the time of a vehicle tire bursts in accordance with the fourth embodiment of this application.

As shown in FIG. 5, when the vehicle is driven by the four wheels of the left front wheel, the right front wheel, the left rear wheel, and the right rear wheel, it is assumed that the total driving torque is 100 Nm, and the driving torque of each wheel is 25 Nm. If the right front wheel has a burst tire during driving, in the case of ensuring that the total driving torque of 100 Nm remains unchanged, the deviation condition of the vehicle can be corrected by increasing the driving torque of the right rear wheel and decreasing the driving torque of the left front wheel and the left rear wheel. For example, the driving torque of the right rear wheel can be increased to 70 Nm, the driving torque of the left front wheel can be decreased to 15 Nm, and the driving torque of the left rear wheel can be decreased to 15 Nm.

It should be noted that, in the embodiment of this application, each wheel has a power output function to correct the undesired deviation condition of the vehicle by controlling the driving torque and the braking torque of the wheels without burst tire when any one of the tires bursts, so that the vehicle can be controlled to drive for a period of time according to the driving intention of the driver when vehicle tire bursts, such as controlling the vehicle to accelerate and decelerate, steering, etc., that is to say, the vehicle is in a controllable state after the tire burst. In addition, for other tire burst conditions, please refer to FIG. 2 to FIG. 5, and details are not described herein.

In summary, although the embodiment of this application does not use run-flat tires, after the vehicle tire burst, the driving torque and the braking torque of the wheels can be re-allocated according to the deviation condition of the vehicle and the driving intention of the driver to prevent the undesired deviation condition of the vehicle and to avoid traffic accidents. Also, the deviation condition of the vehicle can be corrected by controlling the driving torque and the braking torque of the wheels, so that the vehicle can freely accelerate and decelerate within a certain range, and the direction of the vehicle is controllable, wherein the driver can turn the vehicle by operating the steering wheel to maintain normal driving of the vehicle for a relatively long time. Therefore, the control method of the embodiment of this application controls the wheel according to the deviation condition of the vehicle and the driving intention of the driver after the vehicle tire bursts, so that the vehicle can continue to drive according to the driving intention of the driver, thereby not only achieving the effect of using run-flat tires, but also avoiding the problems of noise, vibration and poor fuel economy of the vehicle when using the run-flat tires.

Figure 6:
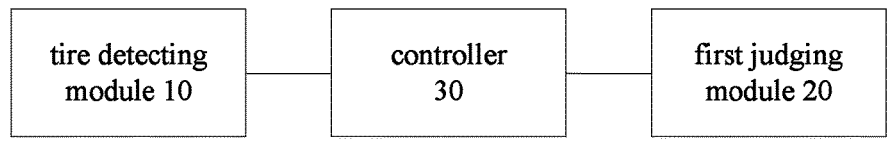
FIG. 6 is a block diagram of a vehicle control system in accordance with an embodiment of this application.

FIG. 6 is a block diagram of a vehicle control system in accordance with an embodiment of this application. As shown in FIG. 6, the vehicle control system includes a tire detecting module 10, a first judging module 20 and a controller 30.

The tire detecting module 10 is used to detect whether the vehicle has a burst tire, and to obtain wheel information of the burst tire when the vehicle has the burst tire. The first judging module 20 is used to judge the deviation condition of the vehicle after the tire bursts. In an embodiment the tire detecting module 10 may be a sensor to judge whether the vehicle has a burst tire and which wheel has the burst tire. The first judging module 20 may be a vehicle body attitude sensor to judge the deviation condition of the vehicle after the vehicle tire bursts.

The controller 30 communicates with the tire detecting module 10 and the first judging module 20 respectively, and the controller 30 is configured to acquire the driving intention of the driver, to calculate the driving torque and the braking torque of the wheels without burst tire according to the deviation condition and the driving intention of the driver, and to control the wheels without burst tire according to the driving torque and the braking torque to correct the deviation condition of the vehicle so that the vehicle maintains normal driving within a preset distance.

According to an embodiment of this application, when the controller 30 acquires the driving intention of the driver, the controller 30 acquires a steering wheel angle signal, a brake pedal signal, an accelerator pedal signal, and a clutch pedal signal of the vehicle, and calculates a steering wheel angular acceleration according to the steering wheel angle signal, calculates the brake pedal acceleration according to the brake pedal signal, and calculates the accelerator pedal acceleration according to the accelerator pedal signal, and then judges the driving intention of the driver according to the steering wheel angle signal, the brake pedal signal, the accelerator pedal signal, the clutch pedal signal, the steering wheel angular acceleration, the brake pedal acceleration and the accelerator pedal acceleration.

That is to say, after the vehicle tire bursts, the controller 30 can calculate and evaluate the driving intention of the driver and the urgency degree based on the steering wheel angle signal, the depth signal of the brake pedal, the depth signal of the accelerator pedal and the depth signal of the clutch pedal (there is no need to detect the depth signal of the clutch pedal when the vehicle has no clutch pedal) detected by the sensor, and the steering wheel angular acceleration, brake pedal acceleration and accelerator pedal acceleration which are simultaneously calculated. Then, the controller 30 calculates and analyzes the deviation condition of the vehicle and the driving intention of the driver to obtain the driving torque and the braking torque of each wheel, and then controls the vehicle according to the driving torque and the braking torque to prevent the undesired deviation condition of the vehicle, so that the vehicle can freely accelerate and decelerate within a certain range, and the driving direction of the vehicle is controllable. The driver makes the vehicle turn according to the intention of the driver by operating the steering wheel, thereby maintaining normal driving of the vehicle for a relatively long distance.

According to an embodiment of this application, the vehicle includes a left front wheel, a right front wheel, a left rear wheel, and a right rear wheel. When the vehicle is driven by the left front wheel and the right front wheel, if the right rear wheel has a burst tire, in the case that the total driving torque of the vehicle is controlled to be constant, the controller 30 corrects the deviation condition of the vehicle by increasing the driving torque of the left front wheel and the right front wheel and braking the left rear wheel, or corrects the deviation condition of the vehicle by increasing the driving torque of the right front wheel and decreasing the driving torque of the left front wheel; when the vehicle is driven by the left front wheel and the right front wheel, if the right front wheel has a burst tire, in the case that the total driving torque of the vehicle is controlled to be constant, the controller corrects the deviation condition of the vehicle by increasing the driving torque of the right rear wheel and decreasing the driving torque of the left front wheel; and when the vehicle is driven by the left front wheel, the right front wheel, the left rear wheel, and the right rear wheel, if the right front wheel has a burst tire, in the case that the total driving torque is controlled to be constant, the controller corrects the deviation condition of the vehicle by increasing the driving torque of the right rear wheel and decreasing the driving torque of the left front wheel and the left rear wheel.

As shown in FIG. 2 and FIG. 3, when the vehicle is driven by the left front wheel and the right front wheel, it is assumed that the total driving torque is 100 Nm, the driving torque of the left front wheel is 50 Nm, and the driving torque of the right front wheel is 50 Nm. If the right rear wheel has a burst tire during driving, the controller 30 will control the wheels without burst tire in a short period of time according to the deviation condition of the vehicle after the tire bursts and the driving intention of the driver. As shown in FIG. 2, in the case of ensuring that the total driving torque of 100 Nm remains unchanged, the deviation condition of the vehicle can be corrected by increasing the driving torque of the left front wheel and the right front wheel and controlling the left rear wheel to participate in the braking. For example, the driving torque of the left front wheel can be increased to 65 Nm, the driving torque of the right front wheel can be increased to 65 Nm, and the braking torque of 30 Nm is applied to the left rear wheel to correct the deviation condition of the vehicle. Alternatively, as shown in FIG. 3, in the case of ensuring that the total driving torque of 100 Nm remains unchanged, the deviation condition of the vehicle can be corrected by increasing the driving torque of the right front wheel and decreasing the driving torque of the left front wheel. For example, the driving torque of the right front wheel can be increased to 70 Nm, and the driving torque of the left front wheel can be reduced to 30 Nm. In practice, any one of them can be chosen.

As shown in FIG. 4, when the vehicle is driven by the left front wheel and the right front wheel, it is assumed that the total driving torque is 100 Nm, the driving torque of the left front wheel is 50 Nm, and the driving torque of the right front wheel is 50 Nm. If the right front wheel has a burst tire during driving, in the case of ensuring that the total driving torque of 100 Nm remains unchanged, the deviation condition of the vehicle can be corrected by increasing the driving torque of the right rear wheel and decreasing the driving torque of the left front wheel. For example, the driving torque of the right rear wheel can be increased to 70 Nm, and the driving torque of the left front wheel can be decreased to 30 Nm.

As shown in FIG. 5, when the vehicle is driven by the four wheels of the left front wheel, the right front wheel, the left rear wheel, and the right rear wheel, it is assumed that the total driving torque is 100 Nm, and the driving torque of each wheel is 25 Nm. If the right front wheel has a burst tire during driving, in the case of ensuring that the total driving torque of 100 Nm remains unchanged, the deviation condition of the vehicle can be corrected by increasing the driving torque of the right rear wheel and decreasing the driving torque of the left front wheel and the left rear wheel. For example, the driving torque of the right rear wheel can be increased to 70 Nm, the driving torque of the left front wheel can be decreased to 15 Nm, and the driving torque of the left rear wheel can be decreased to 15 Nm.

It should be noted that, in the embodiment of this application, each wheel has a power output function to correct the undesired deviation condition of the vehicle by controlling the driving torque and the braking torque of the wheels without burst tire when any one of the vehicle tires burst, so that the vehicle can be controlled to drive for a period of time according to the driving intention of the driver when the vehicle tire bursts, such as controlling the vehicle to accelerate and decelerate, steering, etc., that is to say, the vehicle is in a controllable state after the tires burst. In addition, for other tire burst conditions, please refer to FIG. 2 to FIG. 5, and details are not described herein.

Figure 7:
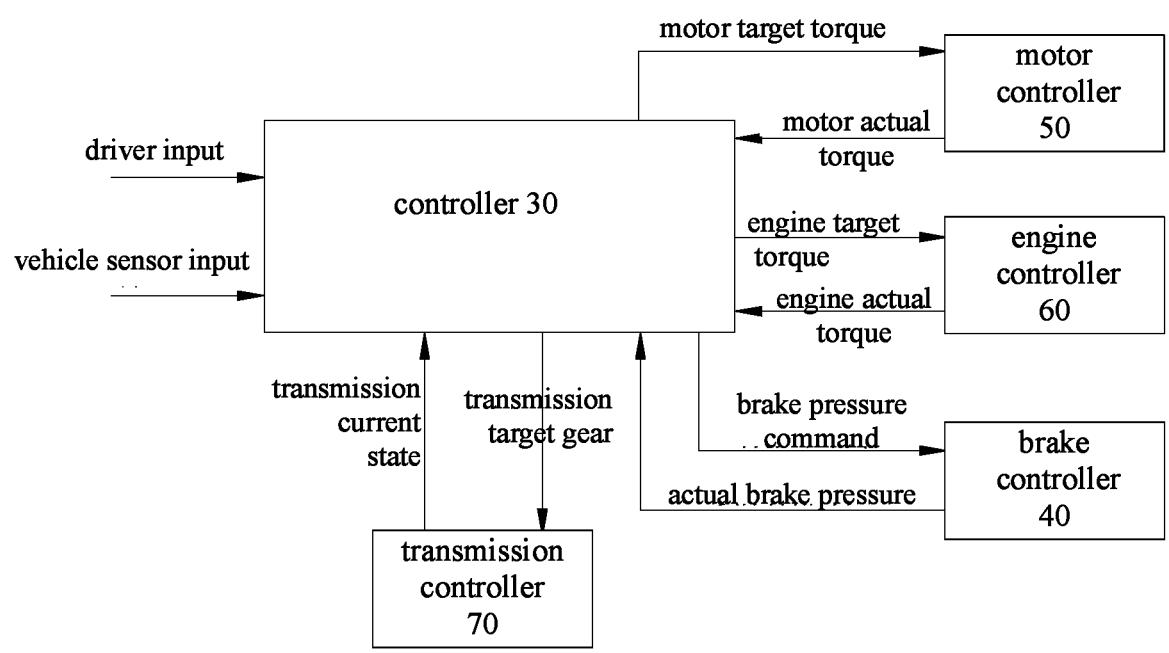
FIG. 7 is a block diagram of a vehicle control system in accordance with an embodiment of this application.
Figure 8:
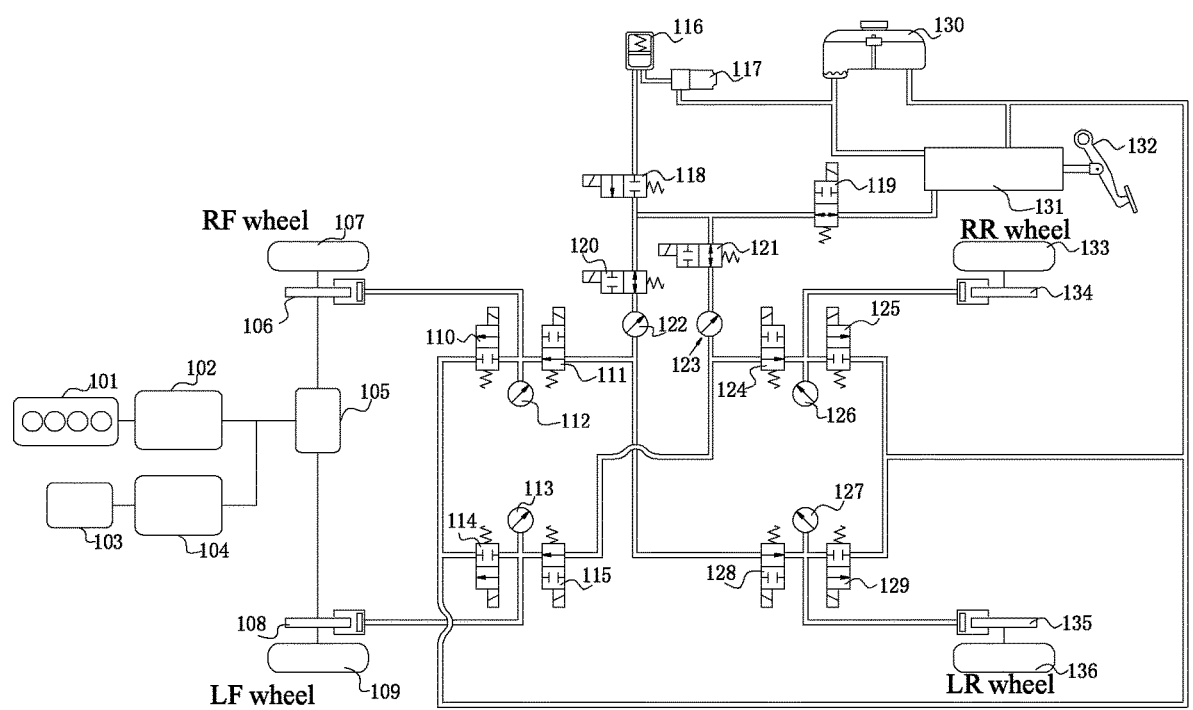
FIG. 8 is a schematic view of the structure of a vehicle in accordance with an embodiment of this application.

Further, as shown in FIGS. 7 to 8, the vehicle may include an engine 101, a transmission 102, a motor 103, a speed reducer 104, a main reduction and differential 105, a right front wheel 107, a left front wheel 109, a right rear wheel 133 and a left rear wheel 136, which the right front wheel 107 is further provided with a brake caliper and a brake disc 106, and correspondingly provided with an inlet valve 110, an outlet valve 111 and an oil pressure sensor 112; the left front wheel 109 is provided with a brake caliper and a brake disc 108, and correspondingly provided with an inlet valve 114, an outlet valve 115 and an oil pressure sensor 113; the right rear wheel 133 is provided with a brake caliper and a brake disc 134, and corresponding provided with an inlet valve 124, an outlet valve 125 and an oil pressure sensor 126; the left rear wheel 136 is provided with a brake caliper and a brake disc 135, and correspondingly provided with an inlet valve 128, an outlet valve 129 and an oil pressure sensor 127. Moreover, the outlet valve 111 is communicated with an accumulator 116 through a linear solenoid valve 120 and a switching solenoid valve 118 after the outlet valve 111 is in communication with the inlet valve 128, and an oil pressure sensor 122 is also provided at the connection port of the outlet valve 111 and the inlet valve 128; after the outlet valve 115 is in communication with the inlet valve 124, the outlet valve 115 is respectively communicated with the switching solenoid valve 118 and the switching solenoid valve 119 through the linear solenoid valve 121, and an oil pressure sensor 123 is also provided at the connection port of the outlet valve 115 and the inlet valve 124. The accumulator 116 is respectively communicated with the oil reservoir 130, the brake master cylinder and the stroke simulator 131 through the hydraulic pump 117, and the brake master cylinder and the stroke simulator 131 are respectively communicated with the switching solenoid valve 119, the brake pedal 132, the oil reservoir 130, the outlet valve 125, the outlet valve 129, the inlet valve 110, and the inlet valve 114.

In an embodiment, when braking the wheel, the controller 30 gives the brake pressure of the hydraulic brake required for brake caliper of each wheel, and it is realized by a brake controller 40 controlling the corresponding switching solenoid valves, the linear solenoid valves, the inlet valves and the outlet valves; for the wheels that can realize motor brake feedback, the controller 30 gives motor brake feedback target torque, and it is realized by a motor controller 50 controlling the motor. When performing the drive control of the wheels, the motor target driving torque can be given by the controller 30 and is realized by the motor controller 50 controlling the motor, or the engine target driving torque is given by the controller 30 and is realized by an engine controller 60 controlling the engine, or the controller 30 gives the motor target driving torque and the engine target driving torque to the motor controller 50 and the engine controller 60, respectively, and it is realized by the motor controller 50 and the engine controller 60 simultaneously controlling the motor and the engine. During the control process, the gear position of the transmission is also adjusted by a shift controller 70.

In summary, although the embodiment of this application does not use run-flat tires, after the vehicle tire burst, the driving torque and the braking torque of the wheels can be re-allocated according to the deviation condition of the vehicle and the driving intention of the driver to prevent the undesired deviation condition of the vehicle and avoid traffic accidents. Also, the deviation condition of the vehicle can be corrected by controlling the driving torque and braking torque of the wheels, so that the vehicle can freely accelerate and decelerate within a certain range, and the direction of the vehicle is controllable, wherein the driver can turn the vehicle by operating the steering wheel to maintain normal driving of the vehicle for a relatively long time. Therefore, for the vehicle control system of the embodiment of this application, after the vehicle tire bursts, through the actively participation of the controller, the wheels are controlled according to the deviation condition of the vehicle and the driving intention of the driver, so that the vehicle can continue to drive according to the driving intention of the driver, thereby not only achieving the effect of using run-flat tires, but also avoiding the problems of noise, vibration and poor fuel economy of the vehicle when using the run-flat tires.

Furthermore, embodiments of this application also propose a vehicle including the above-described vehicle control system. Specifically, as shown in FIG. 7 to FIG. 8, the specific content has been described above, and details are not described herein again.

For the vehicle of the embodiment of this application, after the vehicle tire bursts, through the above described vehicle control system, the wheels are controlled according to the deviation condition of the vehicle and the driving intention of the driver, so that the vehicle can continue to drive according to the driving intention of the driver, thereby not only achieving the effect of using run-flat tires, but also avoiding the problems of noise, vibration and poor fuel economy of the vehicle when using the run-flat tires.

In the description of this application, it is to be understood that the terms "first" and "second" are used for descriptive purposes only and are not to be construed as indicating or implying a relative importance or implicitly indicating the number of technical features indicated. Thus, features defining "first" or "second" may include at least one of the features, explicitly or implicitly. In the description of this application, the meaning of "a plurality of" is at least two, such as two, three, unless specifically defined otherwise.

In this application, unless otherwise explicitly specified and defined, the terms "installation", "connected", "connected", "fixed" and the like shall be understood broadly, for example, it may be understood as a fixed connection, a detachable connection, or an integration; it may be mechanical or electrical connection; it may be directly connected, or indirectly connected through an intermediate medium; it may be the internal communication of two components or the interaction of two components, unless otherwise specified. The specific meanings of the above terms in this application can be understood by those skilled in the art on a case-by-case basis.

In the description of the present specification, the description with reference to the terms "one embodiment", "some embodiments", "example", "specific example", or "some examples" and the like means a specific feature, a structure, material or feature described in connection with the embodiment or example is included in at least one embodiment or example of the invention. In the present specification, the schematic representation of the above terms is not necessarily directed to the same embodiment or example. Furthermore, the particular features, structures, materials, or characteristics described may be combined in a suitable manner in any one or more embodiments or examples. Furthermore, without contradicting each other, one skilled in the art may combine and mix the different embodiments or examples and the features of different embodiments or examples described in this specification.

Although the embodiments of this application have been shown and described, it is understood that the above-described embodiments are illustrative and are not to limit the invention. The above embodiments can be changed, modified, substituted and varied within the scope of the invention for the ordinary technicians in the field.

What is claimed is:

1. A control method when a vehicle tire bursts, comprising the following steps:
    obtaining wheel information of the burst tire when the vehicle tire bursts;
    judging a deviation condition of the vehicle after the tire burst, and obtaining a driving intention of a driver; and
    determining a driving torque and a braking torque of wheels without burst tire according to the deviation condition and the driving intention of the driver, and controlling the wheels without burst tire according to the driving torque and the braking torque to correct the deviation condition of the vehicle, so that the vehicle remains normal driving within a preset distance, wherein the step of obtaining the driving intention of the driver comprises;
    obtaining a steering wheel angle signal, a brake pedal signal, an accelerator pedal signal, and a clutch pedal signal of the vehicle;
    determining a steering wheel angular acceleration according to the steering wheel angle signal, calculating a brake pedal acceleration according to the brake pedal signal, and calculating an accelerator pedal acceleration according to the accelerator pedal signal; and
    judging the driving intention of the driver according to the steering wheel angle signal, the brake pedal signal, the accelerator pedal signal, the clutch pedal signal, the steering wheel angular acceleration, the brake pedal acceleration and the accelerator pedal acceleration.

2. The control method when a vehicle tire bursts according to claim 1, wherein the deviation condition of the vehicle after the tire bursts is judged by a vehicle body attitude sensor.

3. The control method when a vehicle tire bursts according to claim 2, wherein the vehicle comprises a left front wheel, a right front wheel, a left rear wheel, and a right rear wheel, and the vehicle is driven by the left front wheel and the right front wheel, wherein recognizing the right rear wheel tire bursts, in the case that a total driving torque of the vehicle is controlled to be constant, the deviation condition of the vehicle is corrected by increasing a driving torque of the left front wheel and the right front wheel and braking the left rear wheel, or the deviation condition of the vehicle is corrected by increasing a driving torque of the right front wheel and decreasing the driving torque of the left front wheel.

4. The control method when a vehicle tire bursts according to claim 2, wherein the vehicle comprises a left front wheel, a right front wheel, a left rear wheel, and a right rear wheel, wherein the vehicle is driven by the left front wheel, the right front wheel, the left rear wheel, and the right rear wheel, recognizing the right front wheel tire bursts, in the case that a total driving torque is controlled to be constant, the deviation condition of the vehicle is corrected by increasing a driving torque of the right rear wheel and decreasing driving torques of the left front wheel and the left rear wheel.

5. The control method when a vehicle tire bursts according to claim 2, wherein the vehicle comprises a left front wheel, a right front wheel, a left rear wheel, and a right rear wheel, and the vehicle is driven by the left front wheel and the right front wheel, wherein recognizing the right front wheel tire bursts, in the case that the total driving torque of the vehicle is controlled to be constant, the deviation condition of the vehicle is corrected by increasing a driving torque of the right rear wheel and decreasing the driving torque of the left front wheel.

6. The control method when a vehicle tire bursts according to claim 1, wherein the vehicle comprises a left front wheel, a right front wheel, a left rear wheel, and a right rear wheel, and the vehicle is driven by the left front wheel and the right front wheel, wherein recognizing the right rear wheel tire bursts, in the case that a total driving torque of the vehicle is controlled to be constant, the deviation condition of the vehicle is corrected by increasing a driving torque of the left front wheel and the right front wheel and braking the left rear wheel, or the deviation condition of the vehicle is corrected by increasing a driving torque of the right front wheel and decreasing the driving torque of the left front wheel.

7. The control method when a vehicle tire bursts according to claim 1, wherein the vehicle comprises a left front wheel, a right front wheel, a left rear wheel, and a right rear wheel, wherein the vehicle is driven by the left front wheel, the right front wheel, the left rear wheel, and the right rear wheel, recognizing the right front wheel tire bursts, in the case that a total driving torque is controlled to be constant, the deviation condition of the vehicle is corrected by increasing a driving torque of the right rear wheel and decreasing driving torques of the left front wheel and the left rear wheel.

8. The control method when a vehicle tire bursts according to claim 1, wherein the vehicle comprises a left front wheel, a right front wheel, a left rear wheel, and a right rear wheel, and the vehicle is driven by the left front wheel and the right front wheel, wherein recognizing the right front wheel tire bursts, in the case that the total driving torque of the vehicle is controlled to be constant, the deviation condition of the vehicle is corrected by increasing a driving torque of the right rear wheel and decreasing the driving torque of the left front wheel.

9. A vehicle control system, comprising:
a tire detector detecting whether a vehicle has a burst tire, and obtaining wheel information of the burst tire when the vehicle has the burst tire;
a vehicle body attitude sensor configured to judge a deviation condition of the vehicle after the tire bursts;
a controller which respectively communicates with the tire detector and the vehicle body attitude sensor, wherein the controller is configured to obtain a driving intention of the driver, calculate a driving torque and a braking torque of wheels without burst tire according to the deviation condition and the driving intention of the driver, and to control the wheels without burst tire according to the driving torque and the braking torque to correct the deviation condition of the vehicle, so that the vehicle remains normal driving within a preset distance,
wherein the step of obtaining the driving intention of the driver by the controller comprises the following operations;
the controller obtains a steering wheel angle signal, a brake pedal signal, an accelerator pedal signal, and a clutch pedal signal of the vehicle, calculates a steering wheel angular acceleration according to the steering wheel angle signal, calculates a brake pedal acceleration according to the brake pedal signal, and calculates an accelerator pedal acceleration according to the accelerator pedal signal, and judges the driving intention of the driver according to the steering wheel angle signal, the brake pedal signal, the accelerator pedal signal, the clutch pedal signal, the steering wheel angular acceleration, the brake pedal acceleration and the accelerator pedal acceleration.

10. The vehicle control system according to claim 9, wherein the vehicle comprises a left front wheel, a right front wheel, a left rear wheel, and a right rear wheel, and the vehicle is driven by the left front wheel and the right front wheel, wherein if the right rear wheel tire bursts, in the case that a total driving torque of the vehicle is controlled to be constant, the controller corrects the deviation condition of the vehicle by increasing a driving torque of the left front wheel and a right front wheel and braking the left rear wheel, or corrects the deviation condition of the vehicle by increasing the driving torque of the right front wheel and decreasing the driving torque of the left front wheel; and if the right front wheel tire bursts, in the case that the total driving torque of the vehicle is controlled to be constant, the controller corrects the deviation condition of the vehicle by increasing a driving torque of the right rear wheel and decreasing the driving torque of the left front wheel.

11. The vehicle control system according to claim 9, wherein the vehicle comprises a left front wheel, a right front wheel, a left rear wheel, and a right rear wheel, wherein the vehicle is driven by the left front wheel, the right front wheel, the left rear wheel, and the right rear wheel, if the right front wheel tire bursts, in the case that a total driving torque is controlled to be constant, the controller corrects the deviation condition of the vehicle by increasing a driving torque of the right rear wheel and decreasing driving torques of the left front wheel and the left rear wheel.

12. The vehicle control system according to claim 9, wherein the wheels have motor brake feedback, the controller gives motor brake feedback target torque or target driving torque of the wheels without burst tire, and a motor controller controls the motor to drive or brake.

13. A vehicle comprising the vehicle control system according to claim 9.

\* \* \* \* \*